US011100090B2

(12) United States Patent
Ragnoli et al.

(10) Patent No.: US 11,100,090 B2
(45) Date of Patent: Aug. 24, 2021

(54) OFFLOADED CHAINCODE EXECUTION FOR A DATABASE

(71) Applicant: International Business Machines Corporation, Armonk, NY (US)

(72) Inventors: Emanuele Ragnoli, Mulhuddart (IE); Yu Chin Fabian Lim, Singapore (SG); Angelo De Caro, Zürich (CH); Venkatraman Ramakrishna, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 16/182,069

(22) Filed: Nov. 6, 2018

(65) Prior Publication Data

US 2020/0142986 A1 May 7, 2020

(51) Int. Cl.
*G06F 17/30* (2006.01)
*G06F 16/23* (2019.01)
*H04L 9/06* (2006.01)
*G06Q 20/40* (2012.01)
*G06Q 30/08* (2012.01)
*H04L 9/00* (2006.01)

(52) U.S. Cl.
CPC ....... *G06F 16/2379* (2019.01); *G06Q 20/401* (2013.01); *G06Q 30/08* (2013.01); *H04L 9/008* (2013.01); *H04L 9/0637* (2013.01); H04L 2209/38 (2013.01)

(58) Field of Classification Search
USPC ........................................................ 705/75
See application file for complete search history.

(56) References Cited

U.S. PATENT DOCUMENTS

| | | | |
|---|---|---|---|
| 9,794,074 B2* | 10/2017 | Toll | G06F 21/602 |
| 10,102,265 B1* | 10/2018 | Madisetti | G06Q 20/06 |
| 10,664,877 B1* | 5/2020 | Feng | G06Q 30/0212 |
| 2014/0164571 A1 | 6/2014 | Green | |
| 2017/0149819 A1 | 5/2017 | Androulaki et al. | |
| 2017/0243193 A1 | 8/2017 | Manian et al. | |
| 2018/0167198 A1* | 6/2018 | Muller | G06F 21/44 |
| 2019/0018888 A1* | 1/2019 | Madisetti | H04L 9/3297 |
| 2019/0109717 A1* | 4/2019 | Reddy | H04L 9/0643 |
| 2019/0305959 A1* | 10/2019 | Reddy | G06F 8/60 |

(Continued)

FOREIGN PATENT DOCUMENTS

WO 2018006072 A1 1/2018

OTHER PUBLICATIONS

Androulaki, E. et al, Hyperledger Fabric: A Distributed Operating System for Permissioned Blockchains, 2018.

(Continued)

*Primary Examiner* — Firmin Backer

(57) ABSTRACT

An example operation may include one or more of determining, by a first blockchain peer, a chaincode transaction execution needs to be offloaded, receiving bids from one or more second blockchain peers to execute the chaincode transaction, selecting a bid corresponding to a second blockchain peer, executing, by the second blockchain peer corresponding to the selected bid, the chaincode transaction, receiving, by the first blockchain peer, executed chaincode transaction results, and updating a reputation for the second blockchain peer corresponding to the selected bid.

17 Claims, 15 Drawing Sheets

(56) References Cited

U.S. PATENT DOCUMENTS

2019/0318346 A1* 10/2019 Ben-David ............... H04L 9/14
2019/0333031 A1* 10/2019 Kravitz ................ G06Q 20/401
2020/0028697 A1*  1/2020 Unger ................... H04L 63/101
2020/0098072 A1*  3/2020 Escobar ............... G06Q 20/389
2020/0142986 A1*  5/2020 Ragnoli ................ H04L 9/0894

OTHER PUBLICATIONS

Anonymously, A Method for Creating a Declarative and Immutable Blockchain Build System, ip.com. Feb. 14, 2018.
Anonymously, Blockchain-based Distributed Private Value Added Networks for B2B Data Exchange, ip.com, Feb. 8, 2018.
Anonymously, Methodology and Procedure for Secure Granular Authorization and Audit Implementation in Distributed Enterprise Computing Environment, Jun. 11, 2014.
Garcia-Banuelos, L. et al, Blockchain Application—Case Study on Hyperledger Fabric, 2018.

* cited by examiner

OFFLOADED CHAINCODE EXECUTION FOR A DATABASE

TECHNICAL FIELD

This application generally relates to a database storage system, and more particularly, to offloaded chaincode execution for a database.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

Conventionally, a centralized database is limited by an inability of offload chaincode execution. As such, what is needed is a solution to overcome these significant drawbacks.

SUMMARY

One example embodiment provides a system that includes a first blockchain peer and one or more second blockchain peers. The first blockchain peer is configured to perform one or more of determine a received chaincode execution request needs to be offloaded, generate a chaincode transaction for offloaded execution, endorse an execution result that corresponds to the offloaded chaincode transaction execution, and update a reputation. A permissioned blockchain network is coupled to the first blockchain peer, and includes the one or more second blockchain peers. The one or more second blockchain peers are configured to perform one or more of receive the chaincode transaction for offloaded execution, submit bids to execute the offloaded chaincode transaction, and execute the offloaded chaincode transaction in response to the first blockchain peer selects a bid from a second blockchain peer.

Another example embodiment provides a method that includes one or more of determining, by a first blockchain peer, a chaincode transaction execution needs to be offloaded, receiving bids from one or more second blockchain peers to execute the chaincode transaction, selecting a bid corresponding to a second blockchain peer, executing, by the second blockchain peer corresponding to the selected bid, the chaincode transaction, receiving, by the first blockchain peer, executed chaincode transaction results, and updating a reputation for the second blockchain peer corresponding to the selected bid.

A further example embodiment provides a non-transitory computer readable medium comprising instructions, that when read by a processor, cause the processor to perform one or more of determining, by a first blockchain peer, a chaincode transaction execution needs to be offloaded, receiving bids from one or more second blockchain peers to execute the chaincode transaction, selecting a bid corresponding to a second blockchain peer, executing, by the second blockchain peer corresponding to the selected bid, the chaincode transaction, receiving, by the first blockchain peer, executed chaincode transaction results, and updating a reputation for the second blockchain peer corresponding to the selected bid.

DETAILED DESCRIPTION

Figure 1A:
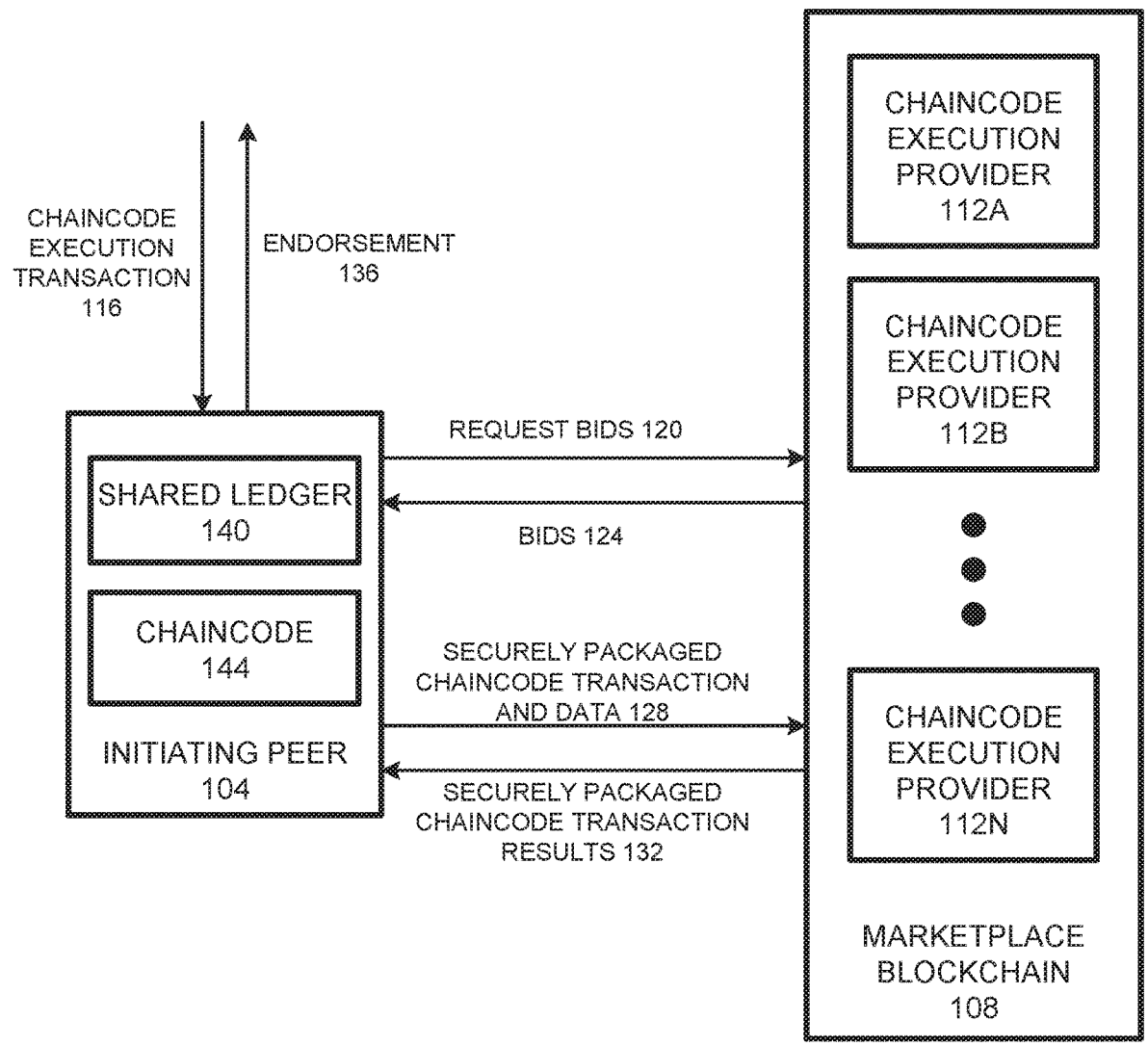
FIG. 1A illustrates a network diagram of a system including a database, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide offloading of chaincode execution transactions.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic, tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include an improved method for managing invoke transactions on peers in permissioned blockchain networks. Overburdened peers consult a blockchain network marketplace to identify available chaincode execution providers (CEPs) that chaincode execution may be offloaded to. Transactions are securely communicated to the selected CEP, the selected CEP executes the chaincode, and the execution results are securely provided back to the offloading peer. Finally, a reputation for the CEP is calculated and stored for future reference to the blockchain network.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the improved method for managing invoke transactions on peers in permissioned blockchain networks is implemented due to immutability/accountability, smart contracts, security, privacy/hidden aspects, decentralization, and endorsement, which are inherent and unique to blockchain. In particular, shared ledger immutability/accountability is enhanced by improving a rate of chaincode execution and thereby updating the shared ledger more efficiently than would otherwise be possible. Smart contract execution rate is improved by offloading overloaded peers to chaincode execution providers (CEPs). Improved security may be achieved by utilizing Intel SGX-enabled processors on chaincode execution providers (CEPs). Privacy is improved by submitting transaction outputs privately via encryption and entrusting chaincode execution to CEPs based in part on reputation. CEPs that could not be trusted would not have strong reputation scores. The present application describes offloading chaincode execution to chaincode execution providers (CEPs), which further decentralize chaincode execution to even more peers than in a standard blockchain network. Endorsement is improved by utilizing submitting peers for transaction endorsement. This guarantees that a trusted peer will be responsible for endorsement.

One of the benefits of the example embodiments is that it improves the functionality of a computing system by improving security and privacy for offloaded chaincode execution. Through the blockchain system described herein, a computing system (CEP) can execute offloaded chaincode invocation in a private and secure manner. Executable chaincode is transferred from an offloading peer to a CEP by using encryption, as well as for transaction outputs transmitted by a CEP to the offloading peer.

The example embodiments provide numerous benefits over a traditional database. For example, through the blockchain the embodiments provide improved methods for managing invoke transactions on peers in permissioned blockchain networks. Meanwhile, a traditional database could not be used to implement the example embodiments because traditional databases do not allow for offloading of execute transactions to trusted peers or include distributed shared ledgers. Accordingly, the example embodiments provide for a specific solution to a problem in the arts/field of load balancing, redundancy, and execution scalability.

The example embodiments also change how data may be stored within a block structure of the blockchain. For example, reputation metrics may be stored within the shared ledger i.e., header, data segment, or metadata) of the data block. By storing reputation metrics within data blocks of a blockchain, the reputation metrics or updated reputation metrics may be appended to an immutable ledger through a hash-linked chain of blocks. In some embodiments, the data block may be different than a traditional data block by including the reputation metrics along with results of chaincode execution that is within a traditional block structure of a blockchain.

In Hyperledger Fabric v1, the process of selecting executing peers for the invocation of chaincode is done manually and coded using a command line interface (CLI) or the software development kit (SDK). However, the Fabric architecture does not offer any mechanism to dynamically select endorser peers for a given transaction and to allocate tasks to them. Yet, high throughput requirements have to be met in the face of limited network resources, and no blockchain application can afford skewed burdens on the various endorsing peers. Skewed burdens means the load on the peers is not uniformly distributed. Some may end up performing a number of chaincode executions, resulting in their CPUs being overburdened, whereas others may perform very few executions and have a lot of free CPU cycles.

Hence, a mechanism to balance the execution load across a network is a primary requirement. Proper load distribution must ensure that privacy and security constraints are not violated. Chaincode and transaction data are sensitive information, and there must also be some assurance that a peer that offers to execute a chaincode does not cheat or return incorrect results. Load distribution must also adequately compensate peers that take up the slack from overloaded endorsers for the use of their resources.

The present application discloses a decentralized market-driven chaincode execution services allocation mechanism to solve the skewed overloading problem stated above. The disclosed method has advantages over one that employs a centralized manager running a load distribution scheme, as that would result in a single point of trust and failure. Here, networks that are ready to offer execution services run a marketplace chaincode, which can be invoked for the purpose of bidding for resources, subsequent execution of chaincode, and communication of results to the requesting peer. Selection of peers for offloading of chaincode execution is based on marketplace incentives (price demanded by bidders) as well as the bidder's reputation, which is updated dynamically over the lifetime of the blockchain.

Security may be provided by ensuring that chaincode executors receive chaincode and transaction information in encrypted form, and must use an HSM (hardware security module) to execute the transaction securely and without data leakage.

The disclosed methods and system provide the following significant benefits for permissioned blockchain networks: it introduces an offloading system, based on trust, for the execution of chaincode, there is minimal overhead on what the peer is already running, the overhead is mainly due to encryption (for example, if a peer were to use zero knowledge proofs, the overhead would much larger. However, if there are no privacy concerns, we can dispense with both encryption and the resulting overhead), it implements a natural solution to offload execution responsibilities, the offloading method balances the load across the peers, it solves peer privacy concerns about sharing the code with other peers, and it gives reassurance to the original peer that the other peers will faithfully execute the code and produce authentic results.

FIG. 1A illustrates a network diagram of a system including a database, according to example embodiments. Referring to FIG. 1A, the network 100 is a permissioned blockchain network, such as a Hyperledger Fabric blockchain network. The blockchain network 100 includes an initiating peer 104, which receives a chaincode execution transaction 116 and a request to endorse the transaction from a client. The initiating peer 104 includes a shared ledger 140, and one or more chaincodes 144. The initiating peer 104 is currently busy, and some latency is expected to execute the chaincode transaction 116. Therefore, the initiating peer 104 attempts to find another peer 112 to execute the chaincode. If the initiating peer 104 is unable to find another peer 112 to execute the chaincode, the initiating peer 104 will execute the chaincode transaction 116.

The blockchain network 100 also includes a marketplace blockchain 108, which includes one or more chaincode execution providers 112, identified as chaincode execution provider 112A and chaincode execution providers 112B through 112N. There may be any number of chaincode execution providers 112 in marketplace blockchain 108.

In response to the initiating peer 104 determining that offloading chaincode transaction execution 116 is needed, the initiating peer 104 requests bids 120 from the marketplace blockchain 108. In turn, the marketplace blockchain 108 determines if any chaincode execution providers 112 wish to bid on executing the chaincode transaction 116, and the participating chaincode execution providers 112 (if any) individually submit bids 124 to the initiating peer 104. In some embodiments, the bids 124 provide an identification of the corresponding chaincode execution provider 112 as well as a cost to execute the chaincode execution transaction 116.

In response to receiving the bids 124, the initiating peer 104 in some embodiments obtains reputation data from each of the submitting chaincode execution providers 112. The reputation data may be stored in the shared ledgers 140. From the submitted costs, and possibly also the reputation data, the initiating peer 104 awards execution of the chaincode transaction 116. In some embodiments, only chaincode execution providers 112 having a minimum reputation specified in the reputation data are candidates for selection. In other embodiments, only chaincode execution providers 112 having a reputation specified in the reputation data are candidates for selection. This embodiment would therefore exclude new chaincode execution providers 112 not yet having established a reputation from consideration.

Once the initiating peer 104 selects a chaincode execution provider 108 to execute the chaincode transaction 116, the initiating peer 104 provides a securely packaged chaincode transaction and data 128 to the selected chaincode execution provider 112 (CEP). Next, the selected CEP 112 executes the chaincode transaction 116, and provides securely packaged chaincode transaction results 132 to the initiating peer 104. The initiating peer 104 then stores the chaincode execution results 132 to the shared ledger 140 and provides endorsement 136 of the transaction to the client. In one embodiment, the initiating peer 104 updates a reputation score for the CEP 112 that executed the chaincode transaction 116. In another embodiment, the initiating peer 104 updates reputation scores for all of the CEPs 112 that provided bids 124. In yet another embodiment, the initiating peer 104 updates a reputation score for the CEP 112 that executed the chaincode transaction with a higher score than other CEPs that submitted bids 124 but were not selected.

Figure 1B:
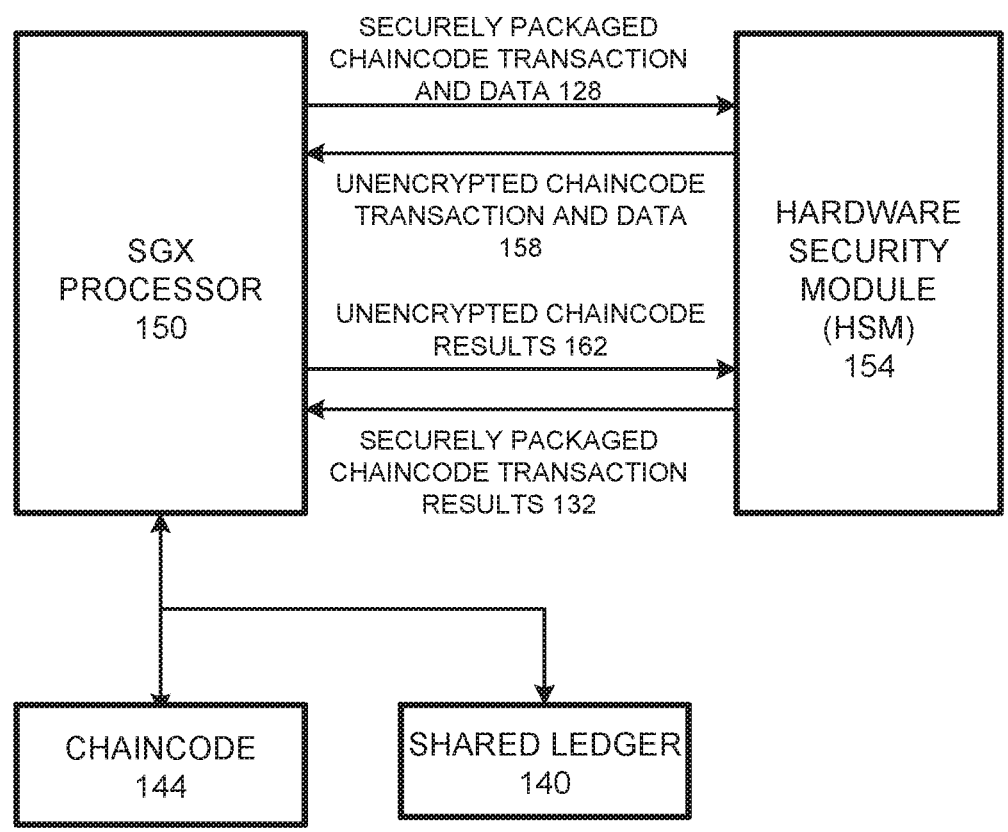
FIG. 1B illustrates a diagram of a chaincode execution provider (CEP), according to example embodiments.

FIG. 1B illustrates a diagram of a chaincode execution provider (CEP) 112, according to example embodiments. Referring to FIG. 1B, the chaincode execution provider 112 includes a processor 150, which in the preferred embodiment may be an INTEL SGX-enabled processor (Software Guard Extensions). INTEL SGX-enabled processors include a new set of CPU instructions that can be used by applications to set aside private regions of code and data. Use of Intel SGX-enabled processors can beneficially provide the following advantages: it allows application developers to protect sensitive data from unauthorized access or modification by rogue software running at higher privilege levels, enables applications to preserve the confidentiality and integrity of sensitive code and data without disrupting the ability of legitimate system software to schedule and manage the use of platform resources, enables consumers of computing devices to retain control of their platforms and the freedom to install and uninstall applications and services as they choose, enables the platform to measure an application's trusted code and produce a signed attestation, rooted in the processor, that includes this measurement and other certification that the code has been correctly initialized in a trustable environment, enables the development of trusted applications using familiar tools and processes, allows the performance of trusted applications to scale with the capabilities of the underlying application processor, enables software vendors to deliver trusted applications and updates at their cadence, using the distribution channels of their choice, and enables applications to define secure regions of code and data that maintain confidentiality even when an attacker has physical control of the platform and can conduct direct attacks on memory.

Chaincode execution providers 112 include one or more chaincodes 144, possibly including the chaincode to be executed from the chaincode transaction 116, and a shared ledger 140. In the preferred embodiment, chaincode execution providers 112 also include a hardware security module 154 (HSM), which securely encodes and decodes chaincode and chaincode execution results. The processor 150 provides securely packaged chaincode transaction and data 128 to the HSM 154, and the HSM 154 may provide unencrypted chaincode transaction and data 158 back to the processor 150. The processor 150 then executes the chaincode, and provides unencrypted chaincode results 162 to the HSM 154. The HSM 154 then encrypts the chaincode results, and provides securely packaged chaincode transaction results 132 to the processor 150. Finally, the processor 150 provides the securely packaged chaincode transaction results 132 to the initiating peer 104. This completes the sequence for offloading the chaincode execution transaction 116. At this point, the execution results are processed as though the initiating node 104 had processed the transaction 116 itself.

Figure 2A:
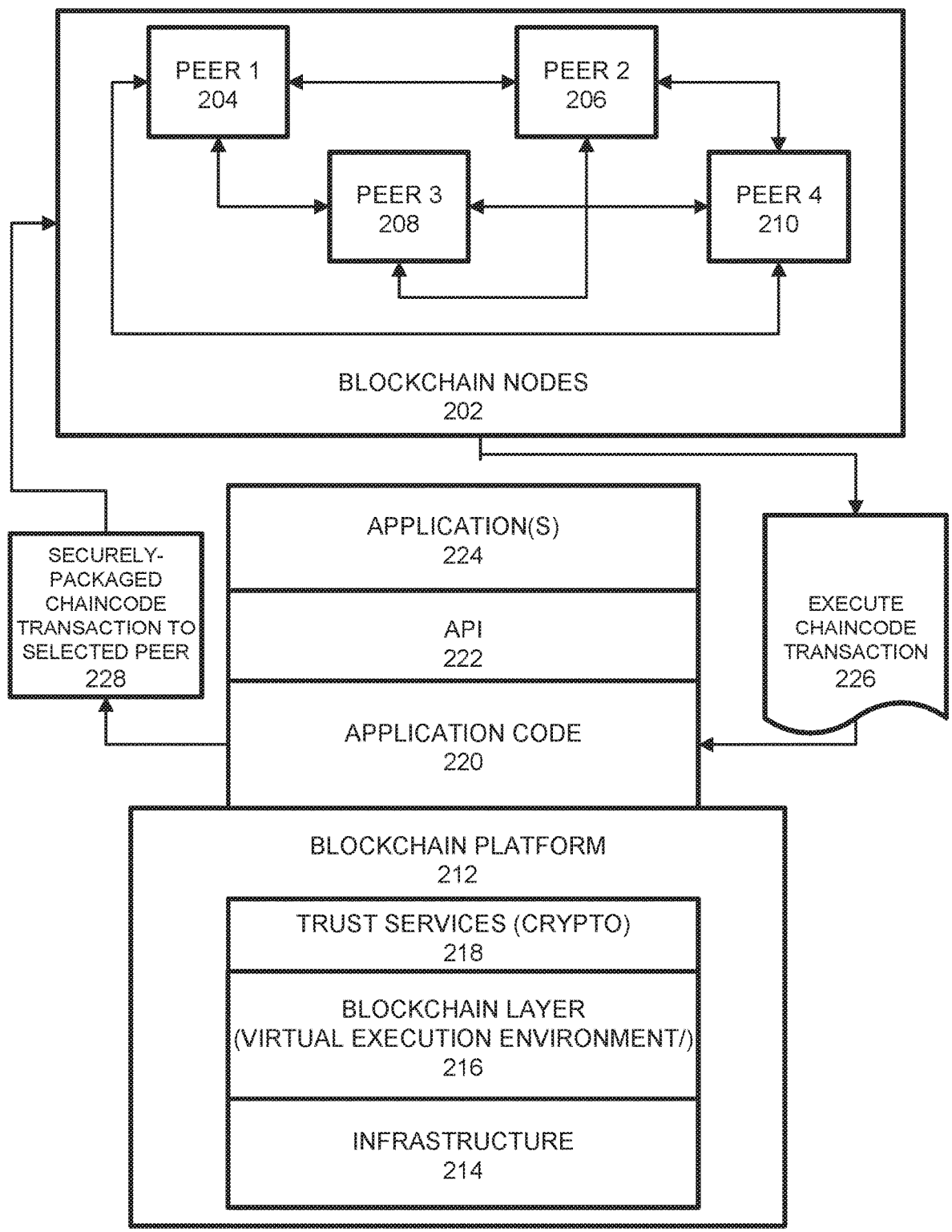
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the execute chaincode transaction 226 may be processed by one or more processing entities (e.g., virtual machines) included in the blockchain layer 216. A securely-packaged chaincode transaction to a selected peer 228 may include encrypted chaincode and data. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, an execute chaincode transaction may be received. One function may be to produce a securely-packaged chaincode transaction to a selected peer, which may be provided to one or more of the peers 204-210.

Figure 2B:
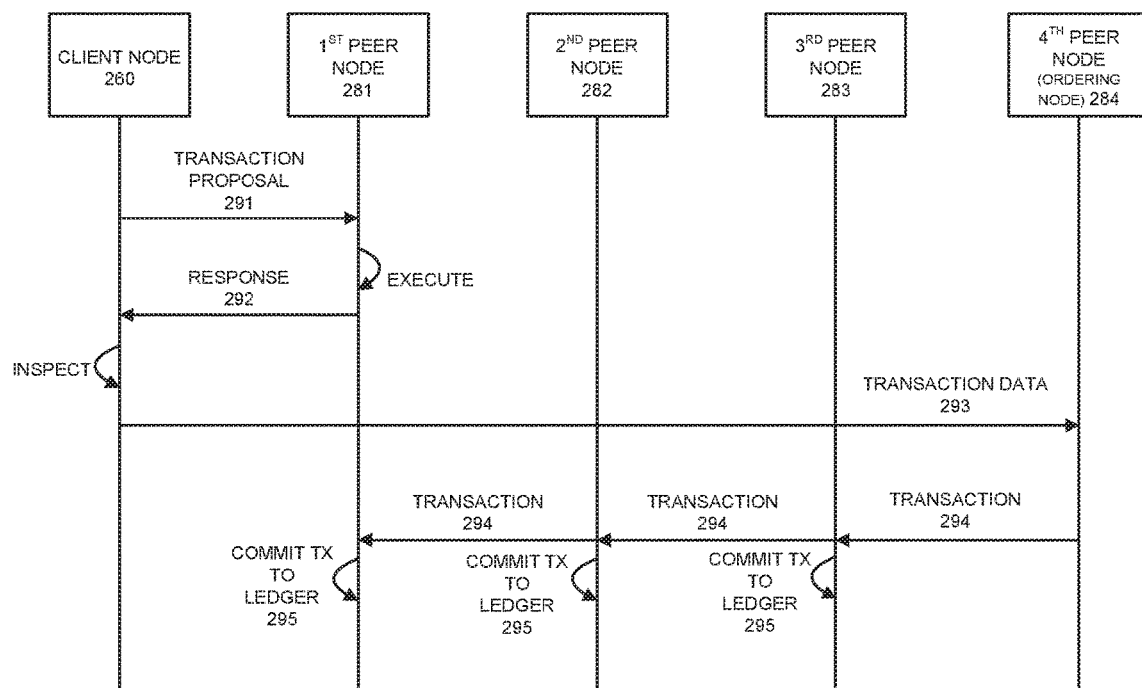
FIG. 2B illustrates a further peer node configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer's 281 signature, is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation. Instead, the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
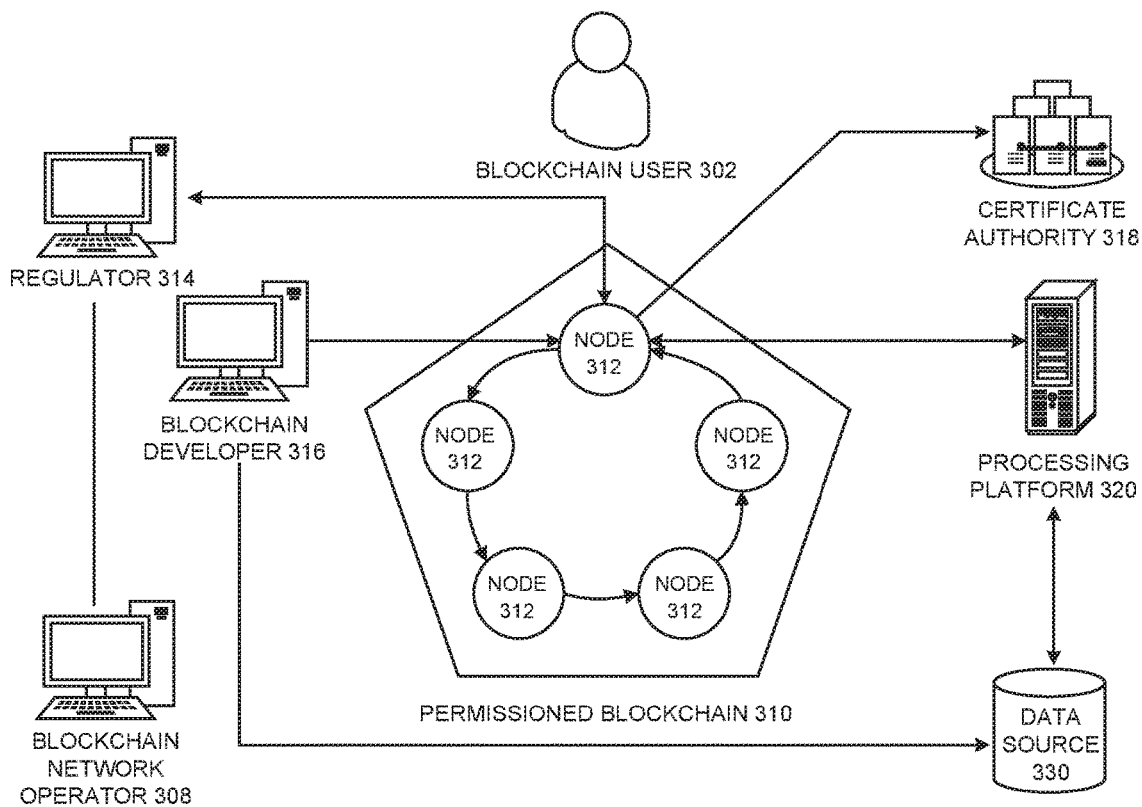
FIG. 3 illustrates a permissioned network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction may be a deploy, invoke, or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manages member permissions, such as enrolling the regulator system 310 as an "auditor" and the blockchain user 302 as a "client". An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
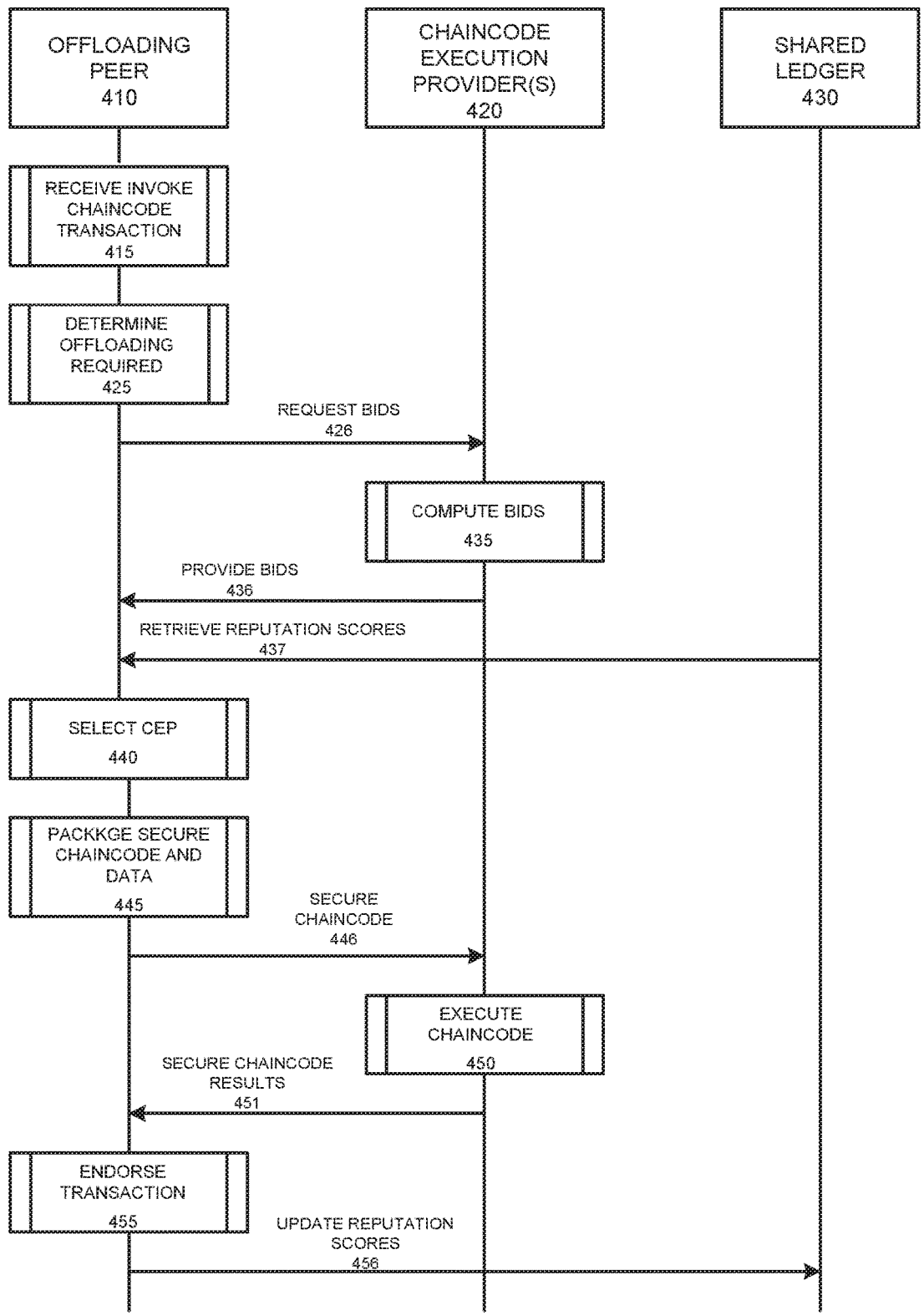
FIG. 4 illustrates a system messaging diagram for performing chaincode execution offloading, according to example embodiments.

FIG. 4 illustrates a system messaging diagram 400 for performing chaincode execution offloading, according to example embodiments. Referring to FIG. 4, the system diagram 400 includes an offloading peer 410, one or more chaincode execution providers (CEPs) 420, and a shared ledger 430. The offloading peer 410 receives an invoke chaincode transaction 415, which instructs the offloading peer 410 to execute a specific chaincode. The offloading peer 410 may execute the requested chaincode as directed, but in this case the offloading peer 410 is significantly busy or otherwise occupied to perform the chaincode execution expeditiously. Therefore, the offloading peer 410 determines the received chaincode transaction 415 should be offloaded to another peer 425.

The offloading peer 410 then provides a request for offloading bids 426 to a marketplace blockchain, which includes the one or more chaincode execution providers 420. The marketplace blockchain is a separate blockchain instance in which CEPs 420 bid for executing invoke transactions and receive reputational values that are recorded on that blockchain. There is a chaincode that provided those functionalities. There may be overlap between the marketplace network and other application blockchain networks, however. Some peers may participate in applications as well as offer execution services on the marketplace, while other peers do not.

The marketplace blockchain identifies which chaincode execution providers 420 are available and wish to participate in the bidding process. Each of the participating chaincode execution providers 420 then calculate bids 435, which include an identification of which chaincode execution provider 420 is submitting the bid, along with a cost to execute the chaincode transaction. The participating chaincode execution providers 420 then provide the bids 436 to the offloading peer 410.

After receiving the provided bids 436 from the participating chaincode execution providers 420, the offloading peer 410 retrieves reputation scores 437 (if available) from the shared ledger 430. Reputation scores 437 are maintained for chaincode execution providers 420 that participated in previous offloaded chaincode execution. The offloading peer 410 calculates scores for each participating chaincode execution provider 420 based on the cost specified in the provided bids 436 and the retrieved reputation scores 437. A participating chaincode execution provider is selected 440 based on the calculated score.

After selecting the CEP, the offloading peer 410 packages secure chaincode and data 445, and transfers the secure chaincode 446 to the selected chaincode execution provider 420. Private/permissioned networks may have partitions, where only a subset of peers participate in a particular application and are privy to that application's chaincode. Since participation in a marketplace may involve breaching those barriers (chaincode leaving the privy set of peers), there exists a need to offer a privacy-preservation option using encryption. However, preferably the tradeoff between privacy and performance should be a guided by a policy framed by the application participants.

The selected chaincode execution provider 420 then executes the chaincode 450, and provides secure chaincode results 451 to the offloading peer 410. The offloading peer 410 endorses the transaction 455, and updates reputation scores 456 for the chaincode execution providers 420 to the shared ledger 420. A reputation model is implemented in the marketplace blockchain. The peer 410 that offloads the invoke transaction asks for certain reputation thresholds to be met or not.

Figure 5A:
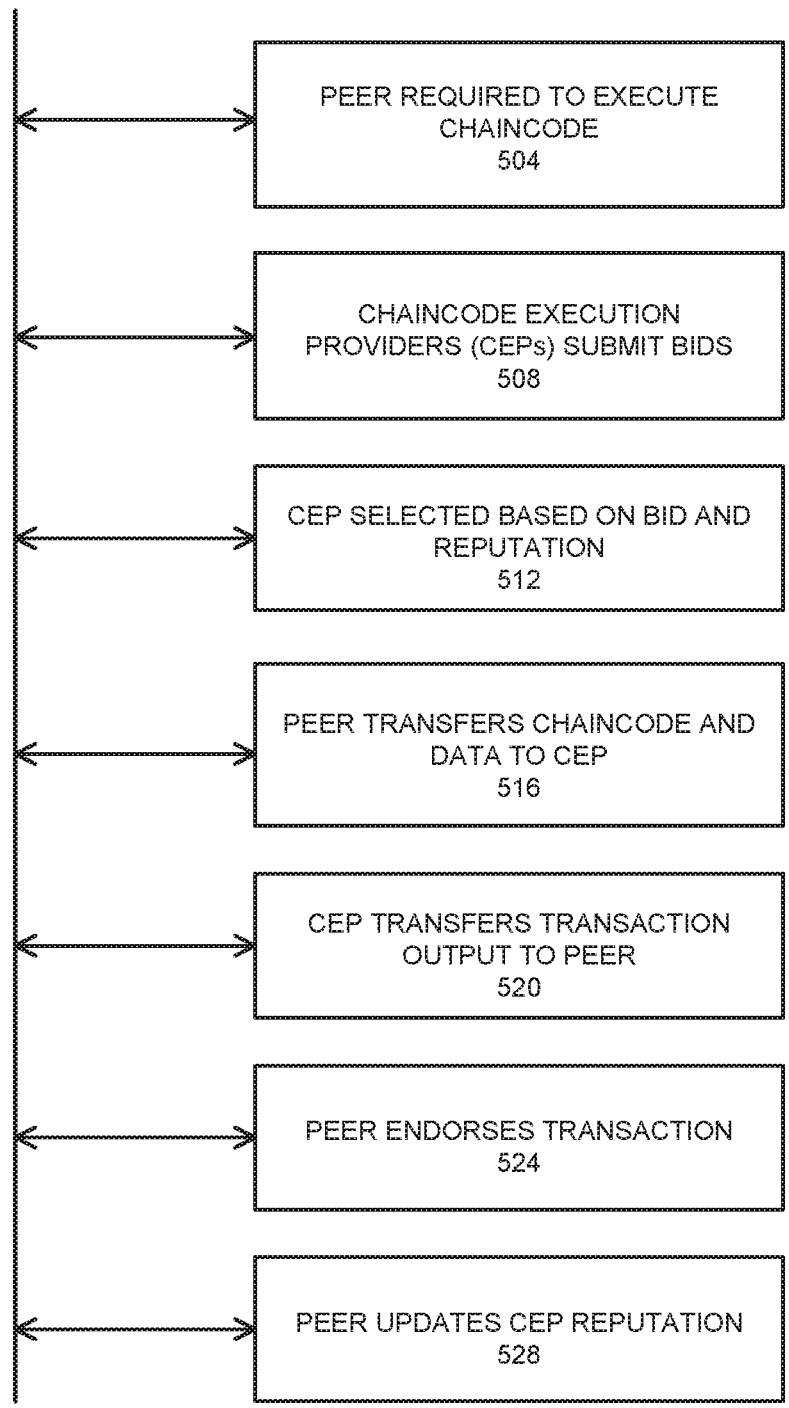
FIG. 5A illustrates a flow diagram of an example method of chaincode execution offloading in a permissioned blockchain, according to example embodiments.

FIG. 5A illustrates a flow diagram 500 of an example method of chaincode execution offloading in a permissioned blockchain, according to example embodiments. Referring to FIG. 5A, the method 500 may include one or more of the following steps.

At block 504, a peer is required to execute a chaincode. The peer is part of a permissioned blockchain network, such as a Hyperledger Fabric Network. The peer, however, is currently overloaded and cannot perform the chaincode execution efficiently or at the present time.

At block 508, one or more chaincode execution providers (CEPs) submit bids to the peer to execute the chaincode. There may be other chaincode execution providers that do not submit bids for many reasons—not being available, for example.

At block 512, the peer selects a CEP to execute the chaincode based on the bid and a reputation associated with the selected CEP. The reputation may be based on previous performance for executing other chaincodes or transactions.

At block 516, the peer transfers the chaincode and data to be executed to the selected CEP. In the preferred embodiment, the chaincode and data are transferred to the selected CEP in a secure package. The chaincode and data includes the actual code to be executed (either in plaintext or encrypted), or alternatively a location (like a URL) to fetch it from, a chaincode ID/version, an expected time of delivery of the execution results (a deadline—either a date or a duration), and a level of encryption that is required.

At block 520, the CEP executes the chaincode and transfers the transaction output (i.e. executed chaincode results) to the peer. In the preferred embodiment, the transaction output or results are transferred to the selected CEP in a secure package.

At block 524, the peer endorses the transaction based on the transaction output or results.

Finally, at block 528, the peer updates the reputation for the selected CEP. In another embodiment, the peer also updates the reputation for all CEPs that submitted bids. In yet another reputation, the peer also updates the reputation for all CEPs in the permissioned network, regardless of whether they submitted bids or not.

Figure 5B:
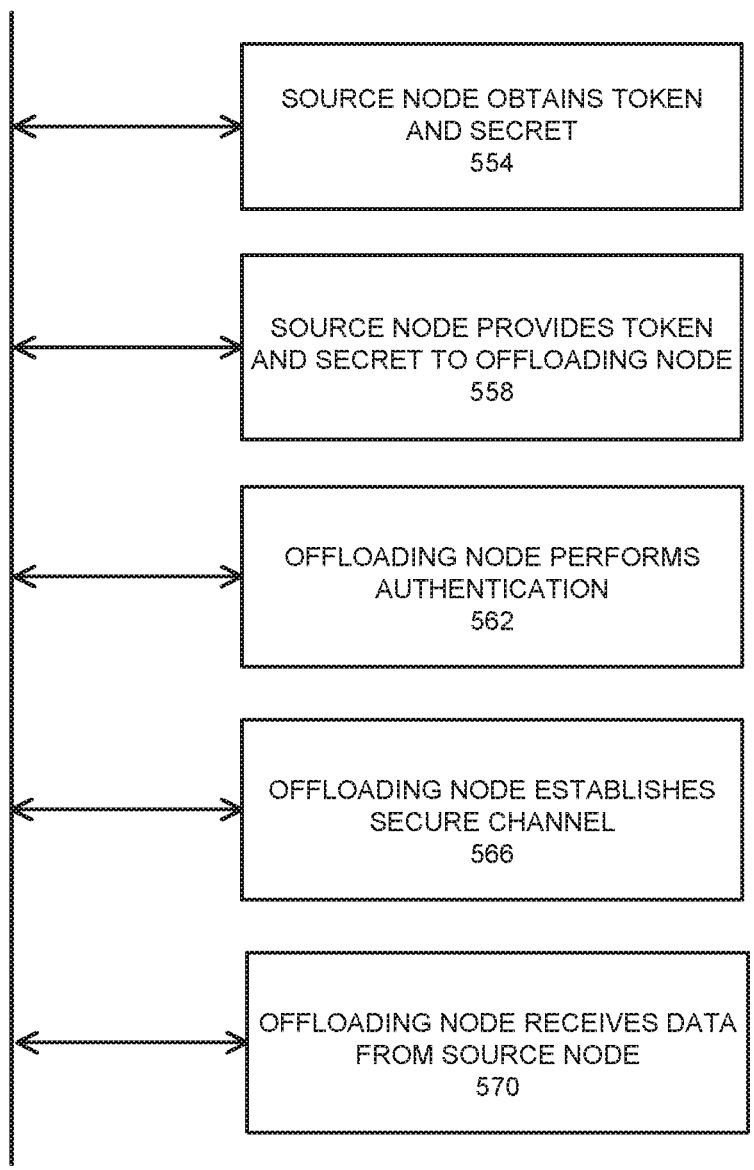
FIG. 5B illustrates a flow diagram of a method of offloading bulk data, according to example embodiments.

FIG. 5B illustrates a flow diagram 550 of a method of offloading bulk data, according to example embodiments. The method may include one or more of the following steps.

At block 554, a source node obtains a token and a secret. A request for an offload read token is sent by the source node. In one embodiment, the source node sends an offload read request to a source storage stack. The source storage stack may deliver the offload read request to the source node. In response to the request, a token is received from the source offload provider. For example, referring to the source node may send a token to an initiator. The token may be conveyed in the same message with or separately from other data such as a secret to extend trust and a channel secret. If generated at the initiator, the secret may be generated and sent in the request for the token. In an alternative embodiment, the secret may also be generated after the request for the token is sent and may be sent after the request is sent. As another alternative embodiment, instead of generating the secret by the initiator, the secret may be obtained from the source offload provider. In this alternative, the secret may be obtained from the offload read response that conveys the token or in a separate message.

At block 558, the source node provides the token and secret to an offloading node. The secret may be provided together with the token in a single offload write command. In another embodiment, the secret may be provided in a separate message from the offload write command in which the token is sent. The secret is provided to the destination offload provider, for example, an offload read initiator may provide the secret to the offload write initiator which provides the secret to the destination offload provider via the destination storage stack. The secret allows the extension of trust. In particular, the secret allows the source offload provider to trust the destination offload provider as the source offload provider trusts the initiator and for the destination offload provider to trust the source offload provider as the destination offload provider trusts the initiator. In one embodiment, the secret may be provided together with the token in a single offload write command. In another implementation, the secret may be provided in a separate message from the offload write command in which the token is sent. The token is provided to the destination offload provider in an offload write command. For example, the offload read initiator may provide the token to the offload write initiator (if they are separate entities) which provides the token to the destination offload provider via the destination storage stack. The offload write command indicates an instruction to copy at least a portion of the immutable data from the source offload provider to the destination offload provider. The source offload provider and the destination offload provider may be the same offload provider or they may be independent of each other. Independent means that they are different offload providers and are not the same offload provider. In one implementation, independent offload providers may be backed by one or more of the same storage devices and/or may share one or more components. In another implementation, independent offload providers are not backed by any common storage and do not share any components.

At block 562, the offloading node authenticates the token and secret. Using the secret and/or other data, the destination may authenticate the source node, and vice versa.

At block 566, the offloading node establishes a secure channel with the source node. The destination establishes a secure communications channel with the source, using a K channel key, and the token is provided to the source. For example, the destination may provide the source node with the token in conjunction with an instruction to copy bulk data represented by the token to the destination.

At block 570, the offloading node receives bulk data from the source node. The destination receives the bulk data via the secure channel from the source node.

Figure 6A:
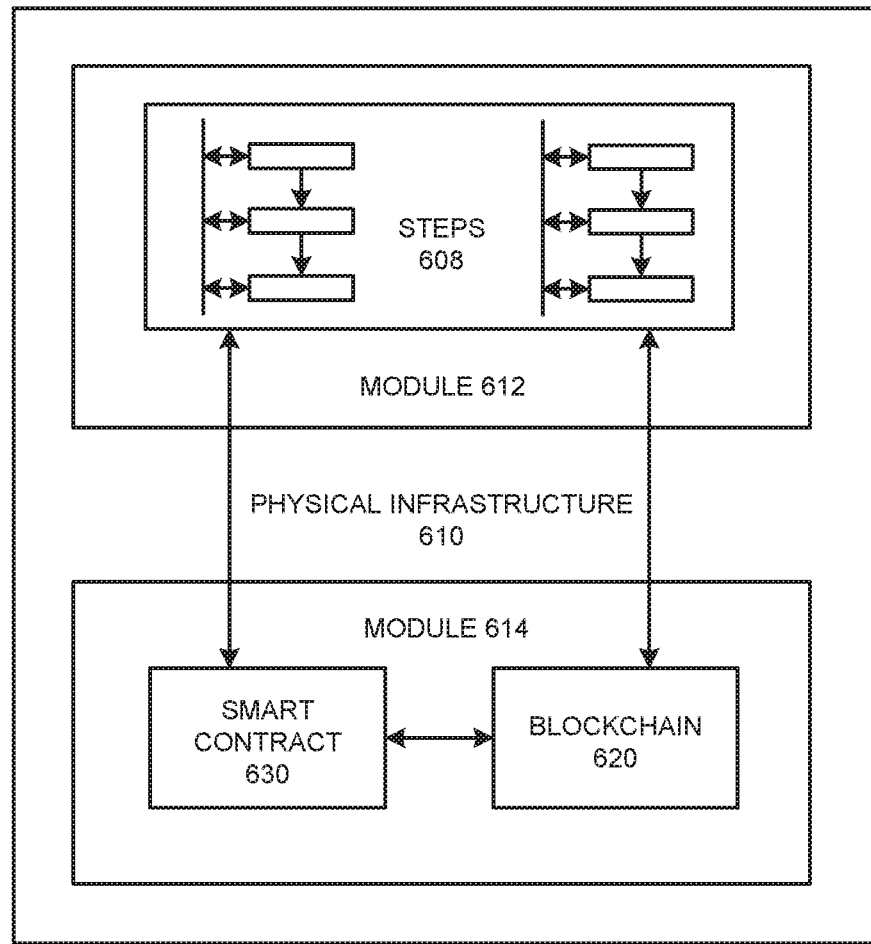
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
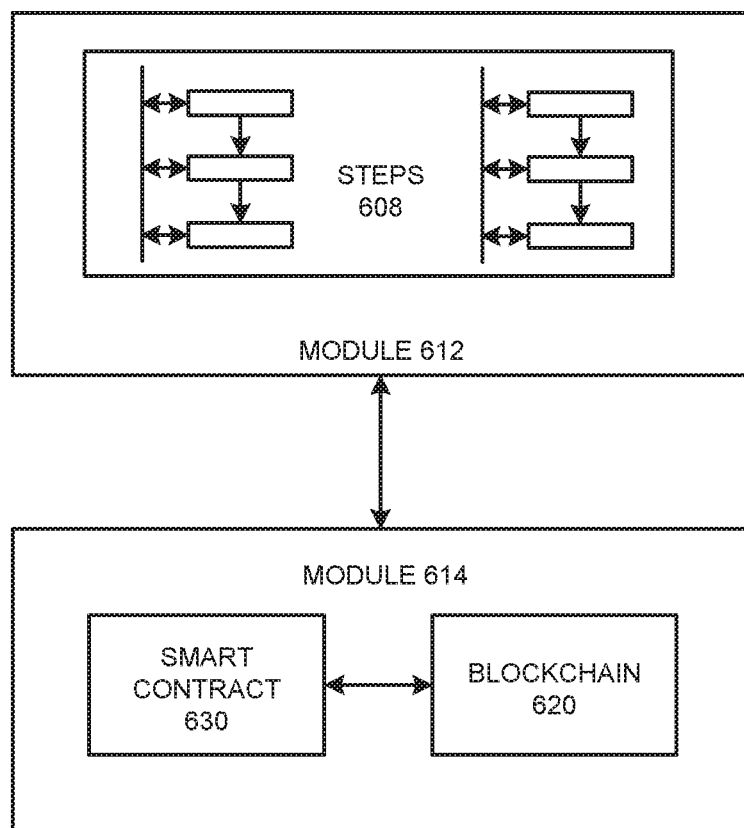
FIG. 6B illustrates a further example system configured to perform one or more operations described herein, according to example embodiments.

FIG. 6B illustrates an example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
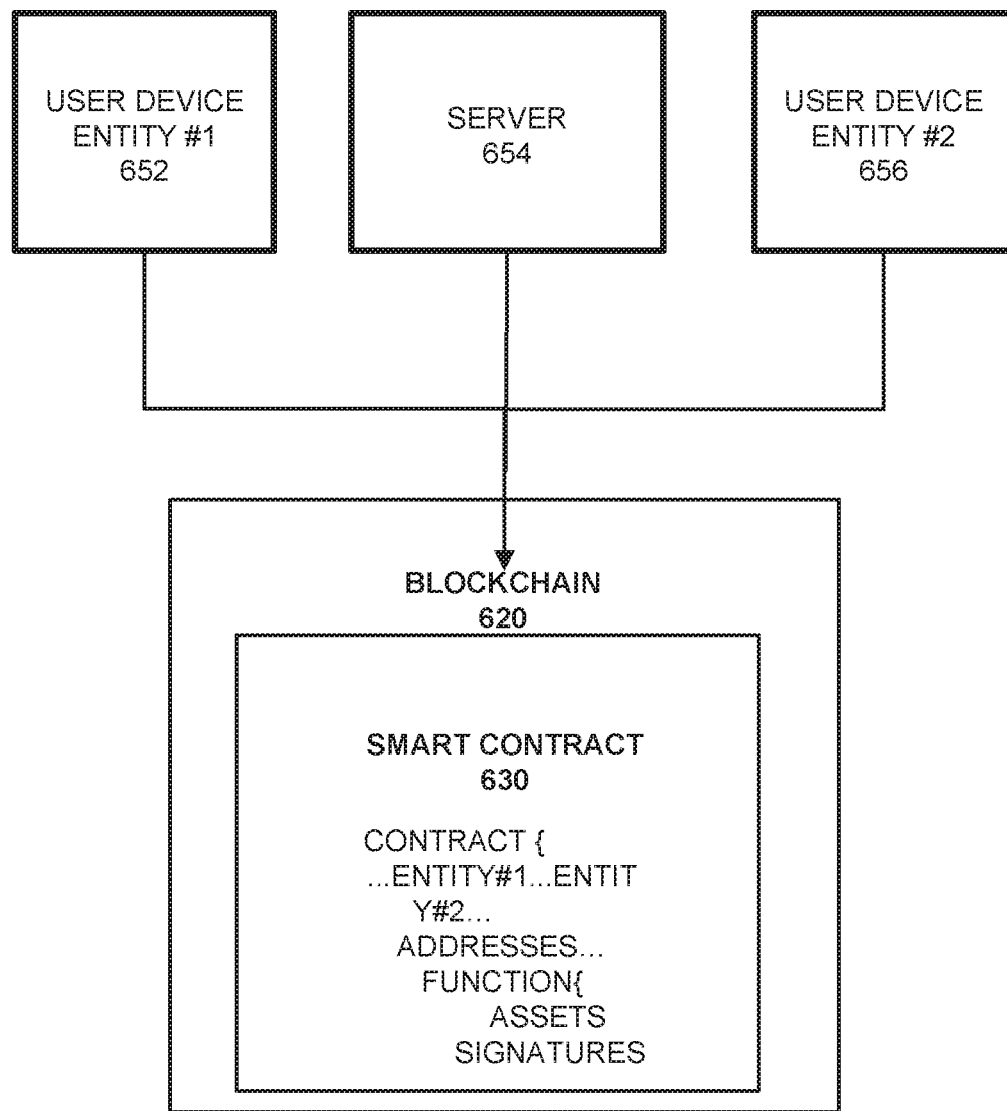
FIG. 6C illustrates a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
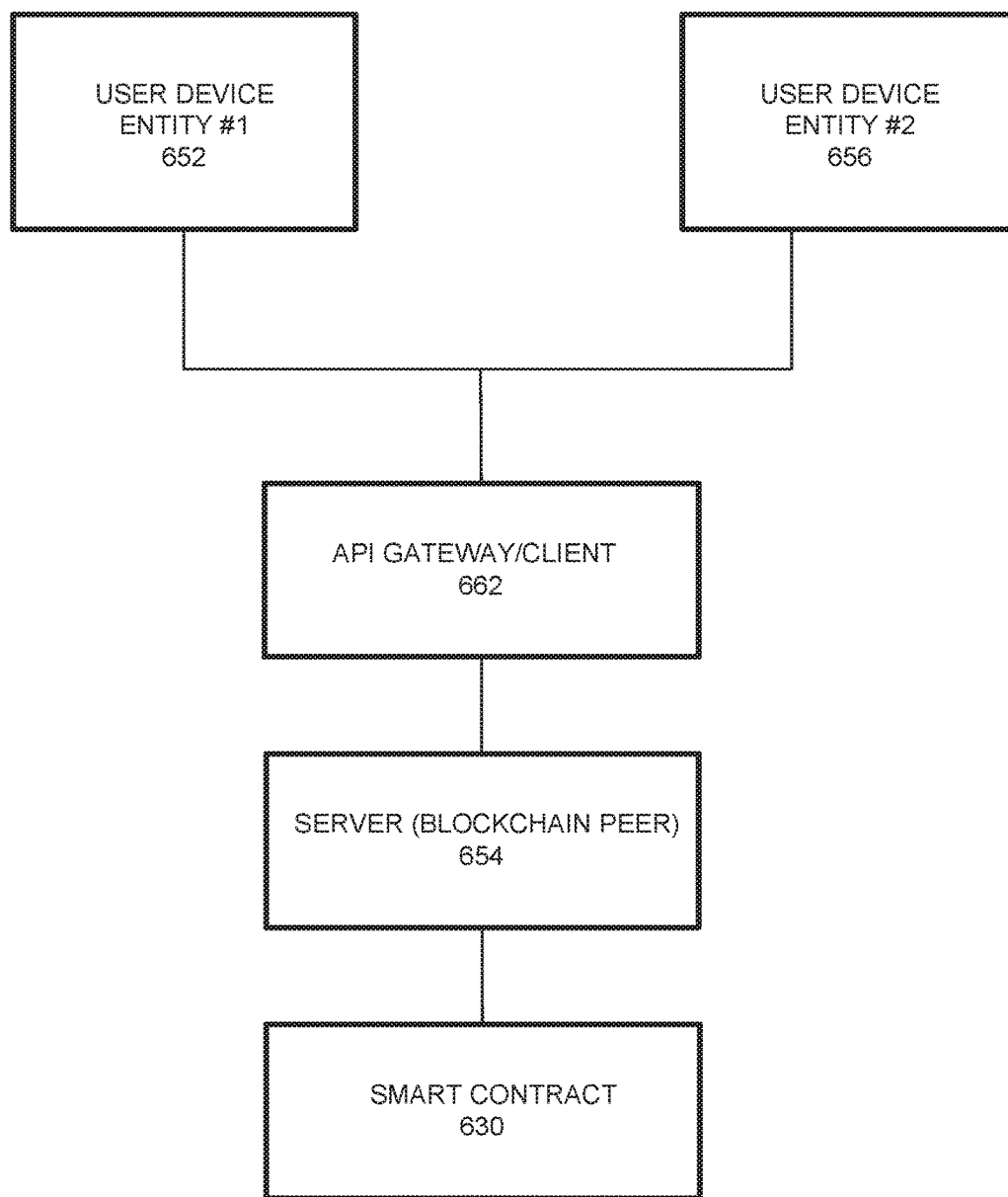
FIG. 6D illustrates an additional example system, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
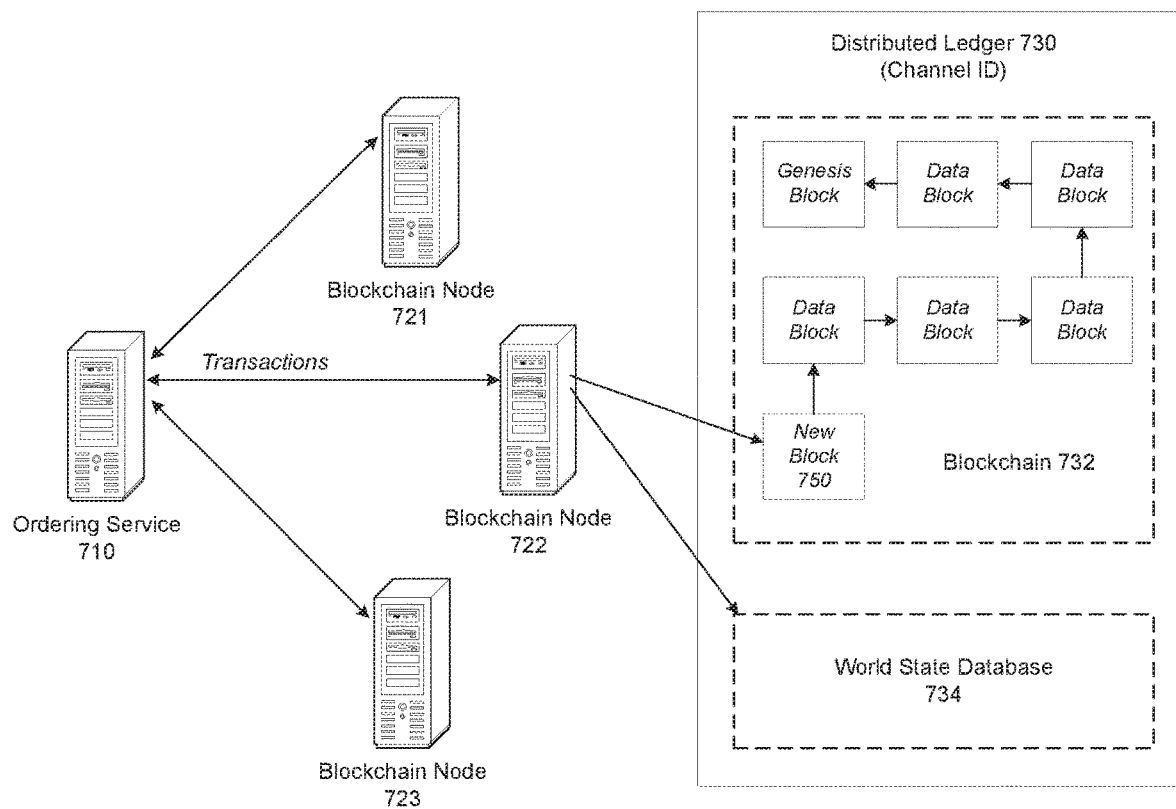
FIG. 7A illustrates a process of new data being added to a database, according to example embodiments.
Figure 7B:
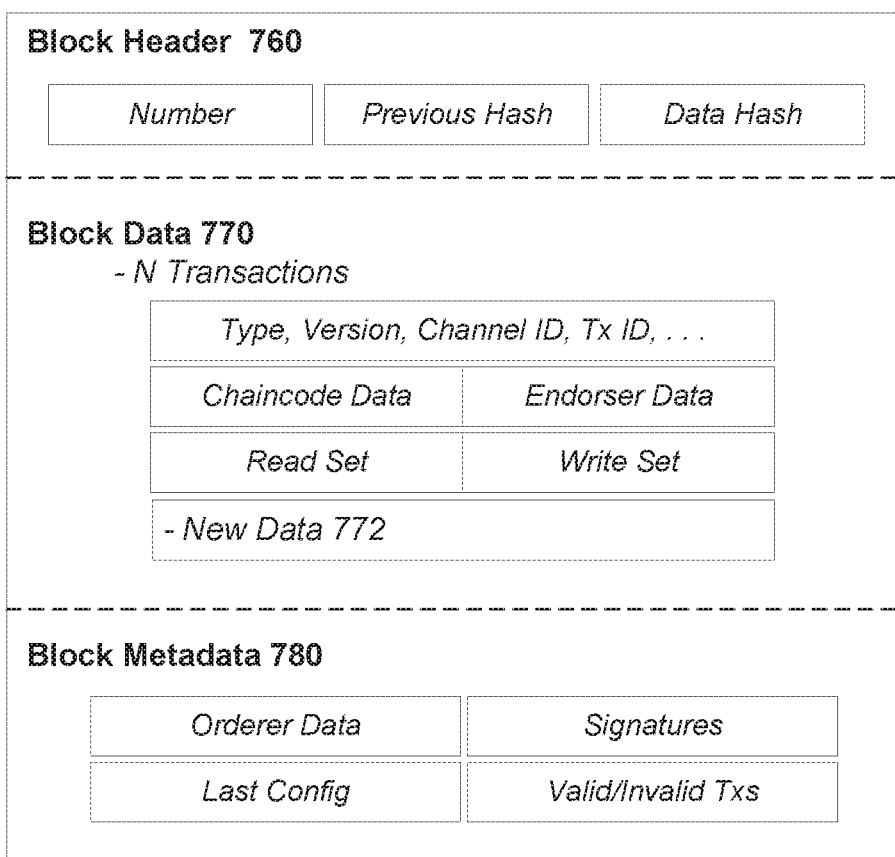
FIG. 7B illustrates contents a data block including the new data, according to example embodiments.

FIG. 7A illustrates a process 700 of a new block being added to a distributed ledger 730, according to example embodiments, and FIG. 7B illustrates contents of a block structure 750 for blockchain, according to example embodiments. Referring to FIG. 7A, clients (not shown) may submit transactions to blockchain nodes 721, 722, and/or 723. Clients may be instructions received from any source to enact activity on the blockchain 730. As an example, clients may be applications that act on behalf of a requester, such as a device, person or entity to propose transactions for the blockchain. The plurality of blockchain peers (e.g., blockchain nodes 721, 722, and 723) may maintain a state of the blockchain network and a copy of the distributed ledger 730. Different types of blockchain nodes/peers may be present in the blockchain network including endorsing peers which simulate and endorse transactions proposed by clients and committing peers which verify endorsements, validate transactions, and commit transactions to the distributed ledger 730. In this example, the blockchain nodes 721, 722, and 723 may perform the role of endorser node, committer node, or both.

The distributed ledger 730 includes a blockchain 732 which stores immutable, sequenced records in blocks, and a state database 734 (current world state) maintaining a current state of the blockchain 732. One distributed ledger 730 may exist per channel and each peer maintains its own copy of the distributed ledger 730 for each channel of which they are a member. The blockchain 732 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 732 are sequenced and cryptographically linked together preventing tampering with blockchain data without breaking the hash links. Furthermore, because of the links, the latest block in the blockchain 732 represents every transaction that has come before it. The blockchain 732 may be stored on a peer file system (local or attached storage), which supports an append-only blockchain workload.

The current state of the blockchain 732 and the distributed ledger 732 may be stored in the state database 734. Here, the current state data represents the latest values for all keys ever included in the chain transaction log of the blockchain 732. Chaincode invocations execute transactions against the current state in the state database 734. To make these chaincode interactions extremely efficient, the latest values of all keys are stored in the state database 734. The state database 734 may include an indexed view into the transaction log of the blockchain 732, it can therefore be regenerated from the chain at any time. The state database 734 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 722 is a committing peer that has received a new data block 750 for storage on blockchain 730.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 730. The architecture of the blockchain network may be designed such that the specific implementation of 'ordering' (e.g., Solo, Kafka, BFT, etc.) becomes a pluggable component.

Transactions are written to the distributed ledger 730 in a consistent order. The order of transactions is established to ensure that the updates to the state database 734 are valid when they are committed to the network. Unlike a cryptocurrency blockchain system (e.g., Bitcoin, etc.) where ordering occurs through the solving of a cryptographic puzzle, or mining, in this example the parties of the distributed ledger 730 may choose the ordering mechanism that best suits that network.

When the ordering service 710 initializes a new block 750, the new block 750 may be broadcast to committing peers (e.g., blockchain nodes 721, 722, and 723). In response, each committing peer validates the transaction within the new block 750 by checking to make sure that the read set and the write set still match the current world state in the state database 734. Specifically, the committing peer can determine whether the read data that existed when the endorsers simulated the transaction is identical to the current world state in the state database 734. When the committing peer validates the transaction, the transaction is written to the blockchain 732 on the distributed ledger 730, and the state database 734 is updated with the write data from the read-write set. If a transaction fails, that is, if the committing peer finds that the read-write set does not match the current world state in the state database 734, the transaction ordered into a block will still be included in that block, but it will be marked as invalid, and the state database 734 will not be updated.

Referring to FIG. 7B, a block 750 (also referred to as a data block) that is stored on the blockchain 732 of the distributed ledger 730 may include multiple data segments such as a block header 760, block data 770, and block metadata 780. It should be appreciated that the various depicted blocks and their contents, such as block 750 and its contents. shown in FIG. 7B are merely for purposes of example and are not meant to limit the scope of the example embodiments. In some cases, both the block header 760 and the block metadata 780 may be smaller than the block data 770 which stores transaction data, however this is not a requirement. The block 750 may store transactional information of N transactions (e.g., 100, 500, 1000, 2000, 3000, etc.) within the block data 770. The block 750 may also include a link to a previous block (e.g., on the blockchain 732 in FIG. 7A) within the block header 760. In particular, the block header 760 may include a hash of a previous block's header. The block header 760 may also include a unique block number, a hash of the block data 770 of the current block 750, and the like. The block number of the block 750 may be unique and assigned in an incremental/sequential order starting from zero. The first block in the blockchain may be referred to as a genesis block which includes information about the blockchain, its members, the data stored therein, etc.

The block data 770 may store transactional information of each transaction that is recorded within the block 750. For example, the transaction data may include one or more of a type of the transaction, a version, a timestamp, a channel ID of the distributed ledger 730, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, chaincode execution transactions, chaincode transaction execution results, reputation scores for chaincode execution providers (CEPs), and the like. The transaction data may be stored for each of the N transactions.

In some embodiments, the block data 770 may also store data 772 which adds additional information to the hash-linked chain of blocks in the blockchain 732. Accordingly, the data 772 can be stored in an immutable log of blocks on the distributed ledger 730. Some of the benefits of storing such data 772 are reflected in the various embodiments disclosed and depicted herein.

The block metadata 780 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 722) may add validity/invalidity information based on an endorsement policy, verification of read/write sets, and the like. The transaction filter may include a byte array of a size equal to the number of transactions in the block data 770 and a validation code identifying whether a transaction was valid/invalid.

Figure 8:
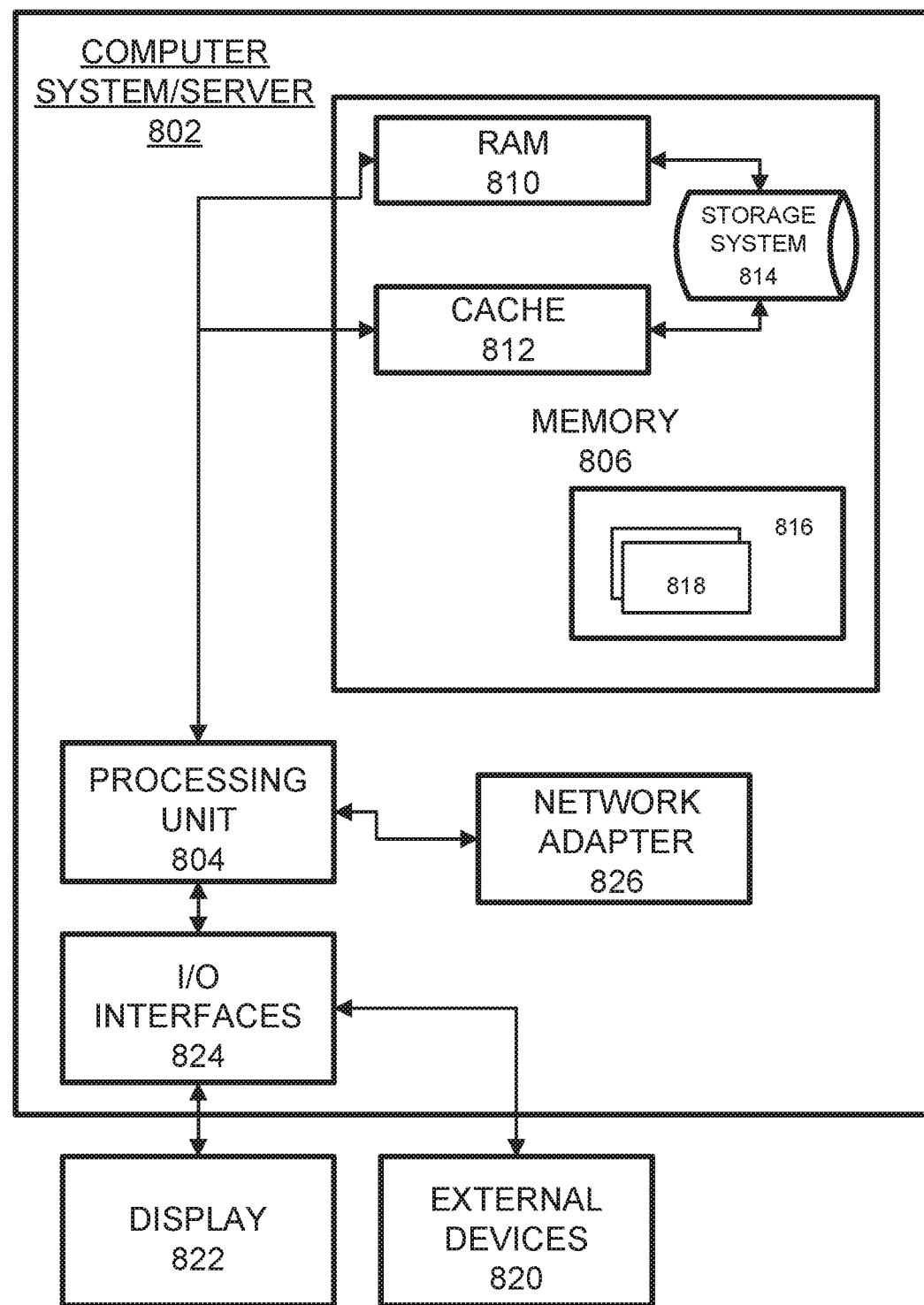
FIG. 8 illustrates an example system that supports one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smart phone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:
1. A system, comprising:
a first blockchain peer, configured to:
    determine a received chaincode execution request to be offloaded;
    generate an encrypted chaincode transaction package for offloaded execution where the encrypted chaincode transaction package includes an encrypted copy of the chaincode to be executed and encrypted data to be processed via execution of the copy of the chaincode;
    transmit the encrypted chaincode transaction package to a second blockchain peer; and
    endorse an execution result that corresponds to the offloaded chaincode transaction execution; and
a permissioned blockchain network, coupled to the first blockchain peer, comprising the second blockchain peer configured to:
    receive the chaincode transaction package for offloaded execution;
    submit bids to execute the offloaded chaincode transaction; and
    execute the copy of the chaincode on the data in response to the first blockchain peer selecting a bid from the second blockchain peer,
wherein the first blockchain peer is further configured to generate a reputation value of the second blockchain peer based on a performance of the execution of the offloaded chaincode transaction by the second blockchain peer, and store the reputation value on a blockchain ledger.

2. The system of claim 1, wherein the first blockchain peer is configured to receive encrypted executed chaincode transaction results.

3. The system of claim 2, wherein the first blockchain peer is further configured to one of encrypt the copy of the chaincode under a public key that corresponds to the second blockchain peer that submits the selected bid or encrypt the copy of the chaincode under a fully homomorphic encryption key.

4. The system of claim 1, wherein the first blockchain peer is further configured to obtain reputation data of the second blockchain peer from the blockchain ledger and select the bid of the second blockchain peer based on the reputation data of the second blockchain peer.

5. The system of claim 4, wherein the first blockchain peer is configured to update the reputation data of the second blockchain peer based on the generated reputation value.

6. The system of claim 1, wherein the second blockchain peer is a member of a marketplace to buy and sell chaincode execution services.

7. A method, comprising:
   determining, by a first blockchain peer, a chaincode transaction execution to be offloaded;
   receiving bids from one or more second blockchain peers to execute the chaincode transaction;
   selecting a bid corresponding to a second blockchain peer;
   generating an encrypted chaincode transaction package for offloaded execution where the encrypted chaincode transaction package includes an encrypted copy of the chaincode to be executed and encrypted data to be processed via execution of the copy of the chaincode;
   transmitting the encrypted chaincode transaction package to the second blockchain peer;
   receiving, by the first blockchain peer, executed chaincode transaction results; and
   generating, by the first blockchain peer, a reputation value of the second blockchain peer based on a performance of the execution of the offloaded chaincode transaction by the second blockchain peer, and storing the reputation value on a blockchain ledger.

8. The method of claim 7, wherein the method further comprises receiving encrypted executed chaincode transaction results.

9. The method of claim 8, wherein the method further comprising:
   encrypting, by the first blockchain peer, the copy of the chaincode under a public key corresponding to the second blockchain peer submitting the selected bid; or
   encrypting, by the first blockchain peer, the copy of the chaincode under a fully homomorphic encryption key.

10. The method of claim 7, wherein the method further comprises:
    obtaining, from the blockchain ledger, reputation data for the second blockchain peer; and
    selecting the bid of the second blockchain peer based on the reputation data of the second blockchain peer.

11. The method of claim 10, wherein the method further comprises updating the reputation data of the second blockchain peer based on the generated reputation value.

12. The method of claim 7, wherein the second blockchain peer is a member of a marketplace for buying and selling of chaincode execution services.

13. A non-transitory computer readable medium comprising instructions, that when read by a processor, cause the processor to perform a method comprising:
    determining, by a first blockchain peer, a chaincode transaction execution to be offloaded;
    receiving bids from one or more second blockchain peers to execute the chaincode transaction;
    selecting a bid corresponding to a second blockchain peer;
    generating an encrypted chaincode transaction package for offloaded execution where the encrypted chaincode transaction package includes an encrypted copy of the chaincode to be executed and encrypted data to be processed via execution of the copy of the chaincode;
    transmitting the encrypted chaincode transaction package to the second blockchain peer;
    receiving, by the first blockchain peer, executed chaincode transaction results; and
    generating, by the first blockchain peer, a reputation value of the second blockchain peer based on a performance of the execution of the offloaded chaincode transaction by the second blockchain peer, and storing the reputation value on a blockchain ledger.

14. The non-transitory computer-readable medium of claim 13, wherein the method further comprises receiving encrypted executed chaincode transaction results.

15. The non-transitory computer-readable medium of claim 14, wherein the method further comprises one of:
    encrypting, by the first blockchain peer, the copy of the chaincode under a public key corresponding to the second blockchain peer; or
    encrypting, by the first blockchain peer, the copy of the chaincode under a fully homomorphic encryption key.

16. The non-transitory computer-readable medium of claim 13, wherein the method further comprises:
    obtaining, from the blockchain ledger, reputation data of the second blockchain peer; and
    selecting the bid of the second blockchain peer based on the reputation data of the second blockchain peer.

17. The non-transitory computer-readable medium of claim 16, wherein the method further comprises updating the reputation data of the second blockchain peer based on the generated reputation value.

* * * * *